US011455782B2

United States Patent
Li et al.

(10) Patent No.: US 11,455,782 B2
(45) Date of Patent: Sep. 27, 2022

(54) TARGET DETECTION METHOD AND APPARATUS, TRAINING METHOD, ELECTRONIC DEVICE AND MEDIUM

(71) Applicant: BEIJING SENSETIME TECHNOLOGY DEVELOPMENT CO., LTD., Beijing (CN)

(72) Inventors: Bo Li, Beijing (CN); Wei Wu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 232 days.

(21) Appl. No.: 16/868,427

(22) Filed: May 6, 2020

(65) Prior Publication Data
US 2020/0265255 A1    Aug. 20, 2020

Related U.S. Application Data

(63) Continuation of application No. PCT/CN2018/114884, filed on Nov. 9, 2018.

(30) Foreign Application Priority Data

Nov. 12, 2017   (CN) .......................... 201711110587.1

(51) Int. Cl.
*G06V 10/22*    (2022.01)
*G06K 9/62*    (2022.01)

(52) U.S. Cl.
CPC .......... *G06V 10/22* (2022.01); *G06K 9/6256* (2013.01); *G06K 9/6267* (2013.01); *G06V 2201/07* (2022.01)

(58) Field of Classification Search
CPC .. G06V 10/22; G06V 2201/07; G06K 9/6256; G06K 9/6267

(Continued)

(56) References Cited

U.S. PATENT DOCUMENTS 6,192,360 B1    2/2001   Dumais et al.
2007/0230792 A1    10/2007   Shashua et al.
2021/0073558 A1*    3/2021   Li ........................ G06N 3/0454

FOREIGN PATENT DOCUMENTS

CN    105976400 A    9/2016
CN    106326837 A    1/2017
(Continued)

OTHER PUBLICATIONS

Hadj-Abdelkader et al.; "Generic Realtime Kernel based Tracking"; IEEE Int'l Conf. on Robotics and Automation; May 2012; p. 3069-3074.

(Continued)

*Primary Examiner* — Michael R Neff
(74) *Attorney, Agent, or Firm* — BakerHostetler

(57) ABSTRACT

Embodiments of the present disclosure disclose a target detecting method and apparatus, a training method, an electronic device, and a medium. The target detecting method includes: separately extracting, by means of a neural network, characteristics of a template frame and a detection frame, where the template frame is a detection box image of a target object, and the template frame is smaller than the detection frame in image size; obtaining a classification weight and a regression weight of a local region detector based on the characteristic of the template frame; inputting the characteristic of the detection frame into the local region detector to obtain classification results and regression results of multiple alternative boxes output by the local region detector; and obtaining a detection box for the target object in the detection frame according to the classification results and regression results of the multiple alternative boxes output by the local region detector. The embodiments of the present disclosure improve the speed and accuracy in target tracking.

20 Claims, 7 Drawing Sheets

(58) Field of Classification Search
USPC .......................................................... 382/157
See application file for complete search history.

(56) References Cited

FOREIGN PATENT DOCUMENTS

| | | |
|---|---|---|
| CN | 106355188 A | 1/2017 |
| CN | 108230359 A | 6/2018 |
| EP | 3229206 A1 | 10/2017 |
| JP | 2018-026108 A | 2/2018 |
| WO | WO 2015/118686 A1 | 8/2015 |

OTHER PUBLICATIONS

"Research and Implementation of Object Tracking Based on Convolutional Neural Network"; Jilin University; May 2015; 54 pages (contains English Abstract see pp. 5 and 6).
Ren et al.; "Faster R-CNN: Towards Real-Time Object Detection with Region Proposal Networks"; IEEE Transactions on Pattern Analysis and Machine Intelligence; Jun. 2016; 14 pages.
Bertinetto et al.; "Fully-Convolutional Siamese Networks for Object Tracking"; European Conf. On Computer Vision; Nov. 2016; 16 pages.
International Patent Application No. PCT/CN2018/114884; Int'l Search Report; dated Feb. 13, 2019; 2 pages.

\* cited by examiner

TARGET DETECTION METHOD AND APPARATUS, TRAINING METHOD, ELECTRONIC DEVICE AND MEDIUM

The present application is a bypass continuation of and claims priority under 35 U.S.C. § 111(a) to PCT Application. No. PCT/CN2018/114884, filed on Nov. 9, 2018, which claims priority to Chinese Patent Application No. CN201711110587.1, filed with the Chinese Patent Office on Nov. 12, 2017 and entitled "TARGET DETECTING METHOD AND APPARATUS, TRAINING METHOD, ELECTRONIC DEVICE, AND MEDIUM", which is incorporated herein by reference in its entirety.

TECHNICAL FIELD

The present disclosure relates to computer vision technologies, and in particular, to a target detecting method and apparatus, a training method, an electronic device, and a medium.

BACKGROUND

Single target tracking is a significant problem in the field of artificial intelligence and can be applied in a series of tasks such as automatic driving and multi-target tracking. The major task of the single target tracking is: designating a target to be tracked in a certain image frame of a video sequence and keeping tracking the designated target in subsequent image frames.

SUMMARY

Embodiments of the present disclosure provide a technical solution of target tracking.

According to one aspect of the embodiments of the present disclosure, a target tracking method is provided, including:

separately extracting, by means of a neural network, characteristics of a template frame and a detection frame, where the template frame is a detection box image of a target object, and the template frame is smaller than the detection frame in image size;

obtaining a classification weight and a regression weight of a local region detector based on the characteristic of the template frame;

inputting the characteristic of the detection frame into the local region detector to obtain classification results and regression results of multiple alternative boxes output by the local region detector;

obtaining a detection box for the target object in the detection frame according to the classification results and regression results of the multiple alternative boxes output by the local region detector.

According to another aspect of the embodiments of the present disclosure, a target detecting network training method is provided, including:

separately extracting, by means of a neural network, characteristics of a template frame and a detection frame, where the template frame is a detection box image of a target object, and the template frame is smaller than the detection frame in image size;

increasing channels of the characteristic of the template frame by means of a first convolutional layer to obtain a first characteristic as a classification weight of a local region detector; increasing channels of the characteristic of the template frame by means of a second convolutional layer to obtain a second characteristic as a regression weight of the local region detector;

inputting the characteristic of the detection frame into the local region detector to obtain classification results and regression results of multiple alternative boxes output by the local region detector;

obtaining a detection box for the target object in the detection frame according to the classification results and regression results of the multiple alternative boxes output by the local region detector; and taking the obtained detection box for the target object in the detection frame as a predictive detection box, training the neural network, the first convolutional layer, and the second convolutional layer based on label information of the detection frame and the predictive detection box.

According to yet another aspect of the embodiments of the present disclosure, a target detecting apparatus is provided, including:

a neural network, configured to separately extract characteristics of a template frame and a detection frame, where the template frame is a detection box image of a target object, and the template frame is smaller than the detection frame in image size;

a first convolutional layer, configured to increase channels of the characteristic of the template frame to obtain a first characteristic as a classification weight of a local region detector;

a second convolutional layer, configured to increase channels of the characteristic of the template frame to obtain a second characteristic as a regression weight of the local region detector;

the local region detector, configured to output classification results and regression results of multiple alternative boxes according to the characteristic of detection frame; and an obtaining unit, configured to obtain a detection box for the target object in the detection frame according to the classification results and regression results of the multiple alternative boxes output by the local region detector.

According to still another aspect of the embodiments of the present disclosure, an electronic device is provided, including the target detecting apparatus according to any one of the foregoing embodiments.

According to still another aspect of the embodiments of the present disclosure, an electronic device is provided, including:

a memory, configured to store executable instructions; and a processor, configured to communicate with the memory to execute the executable instructions so as to complete the operations of the method according to any one of the forgoing embodiments of the present disclosure.

According to still another aspect of the embodiments of the present disclosure, a computer storage medium is provided, configured to store computer-readable instructions, where when the instructions are executed, the operations of the method according to any one of the foregoing embodiments of the present disclosure are implemented.

According to still another aspect of the embodiments of the present disclosure, a computer program is provided, including computer-readable instructions, where when the computer-readable instructions run in a device, where a processor in the device executes executable instructions for implementing the steps of the method according to any one of the foregoing embodiments of the present disclosure.

Based on the embodiments of the disclosure, characteristics of a template frame and a detection frame are separately extracted by means of a neural network, a classification weight and a regression weight of a local region detector are obtained based on the characteristic of the template frame, the characteristic of the detection frame is input into the local region detector to obtain classification results and regression results of multiple alternative boxes output by the local region detector, and a detection box for the target object in the detection frame is obtained according to the classification results and regression results of the multiple alternative boxes output by the local region detector. Based on the embodiments of the present disclosure, similar characteristics of the same target object may be better extracted by using the same neural network or neural networks of the same structure, so that changes in the characteristics of the target object extracted in different frames are small, which facilitates improving accuracy of a target object detection result in a detection frame; a classification weight and a regression weight of a local region detector are obtained based on the characteristic of the template frame, and the local region detector obtains classification results and regression results of multiple alternative boxes of the detection frame to obtain a detection box for the target object in the detection frame, where changes in the position and size of the target object are better estimated, and the position of the target object in the detection frame is found more accurately, so that the speed and accuracy in target tracking are improved, the tracking effect is good, and the speed is high.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
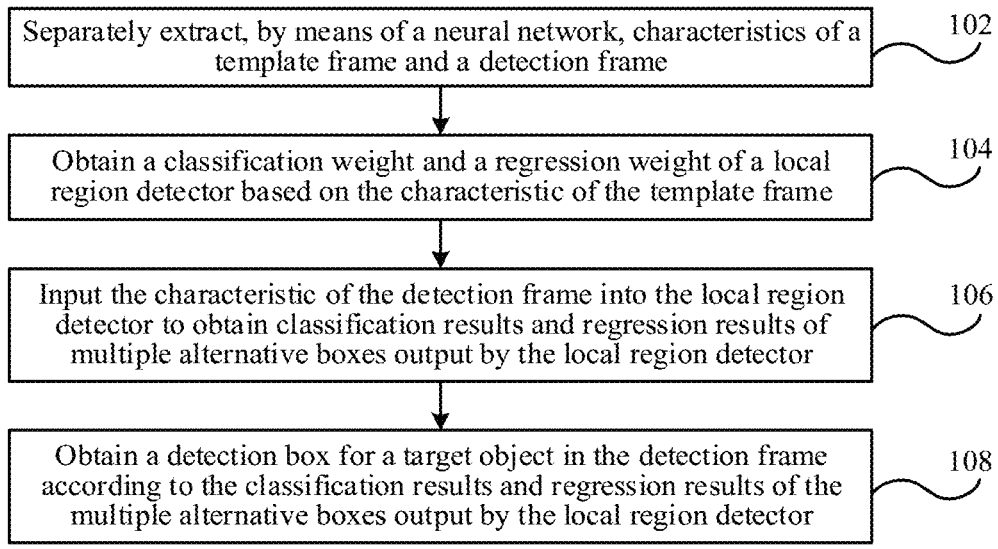
FIG. 1 is a flow chart of an embodiment of a target detecting method of the present disclosure.

Various exemplary embodiments of the present disclosure are now described in detail with reference to the accompanying drawings. It should be noted that: unless otherwise stated specifically, relative arrangement of the components and steps, the numerical expressions, and the values set forth in the embodiments are not intended to limit the scope of the present disclosure.

It should be further understood that in the embodiments of the present disclosure, "a plurality of" may refer to two or more, and "at least one" may refer to one, two, or more.

A person skilled in the art may understand that the terms such as "first" and "second" in the embodiments of the present application are only used to distinguish different steps, devices or modules, etc., and do not represent any specific technical meaning or an inevitable logical sequence therebetween.

It should be further understood that any component, data, or structure mentioned in the embodiments of the present disclosure should be generally understood as one or more under the condition that no explicit definition is provided or no opposite motivation is provided in the context.

It should be further understood that the description of the embodiments of the present disclosure emphasizes the differences between the embodiments, and the same or similar points therebetween may be used as reference and are omitted for clarity.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 is a flow chart of an embodiment of a target detecting method of the present disclosure. As shown in FIG. 1, the target detecting method of the present embodiment includes the following steps.

At 102, characteristics of a template frame and a detection frame are separately extracted by means of a neural network.

The template frame is a detection box image of a target object, and the template frame is smaller than the detection frame in image size. The detection frame is a current frame on which target object detection needs to be performed, or a regional image which may include the target object in the current frame. If the detection frame is the regional image which may include the target object in the current frame on which the target object detection needs to be performed, in one embodiment of the embodiments of the present disclosure, the regional image is greater than the template frame in image size, for example, the regional image is 2 to 4 times of the template frame in image size by taking a center point of the template frame image as the center point.

In one embodiment of the embodiments of the present disclosure, the template frame is a frame which is before the detection frame in detection timing in a video sequence and determined by the detection box for the target object, and may be a start frame which needs to perform target tracking in the video sequence, where the start frame is flexible in position in a video frame sequence, and may be the first frame or any intermediate frame in the video frame sequence. The detection frame is a frame which needs to perform the target tracking, and after the target object is determined in the detection frame image, an image corresponding to the detection box in the detection frame is recognized as a template frame image of the next detection frame.

In one embodiment of the embodiments of the present disclosure, at operation 102, the characteristics of the template frame and the detection frame may be separately extracted by means of the same neural network; or the characteristics of the template frame and the detection frame may be respectively extracted by means of different neural networks of the same structure.

In an optional example, step 102 may be executed by invoking, by a processor, corresponding instructions stored in a memory, and may also be executed by the neural network run by the processor.

At 104, a classification weight and a regression weight of a local region detector are obtained based on the characteristic of the template frame.

In one embodiment of the embodiments of the present disclosure, a convolution operation is performed on the characteristic of the template frame by means of a first convolutional layer, where a first characteristic obtained by the convolution operation is used as the classification weight of the local region detector.

For example, in an optional example therein, the classification weight of the local region detector is obtained in the following mode: increasing the number of channels of the characteristic of the template frame by means of the first convolutional layer to obtain the first characteristic, the number of channels of the first characteristic is 2 k times of that of the characteristic of the template frame, where k is an integer greater than 0.

In one embodiment of the embodiments of the present disclosure, a convolution operation is performed on the characteristic of the template frame by means of a second convolutional layer, where a second characteristic obtained by the convolution operation is used as the regression weight of the local region detector.

For example, in an optional example therein, the regression weight of the local region detector is obtained in the following mode: increasing the number of channels of the characteristic of the template frame by means of the second convolutional layer to obtain the second characteristic, the number of channels of the second characteristic is 4 k times of that of the characteristic of the template frame, where k is an integer greater than 0.

In an optional example, step 104 may be executed by invoking, by a processor, corresponding instructions stored in a memory, and may also be executed by the first convolutional layer and the second convolutional layer run by the processor.

At 106, the characteristic of the detection frame is input into the local region detector to obtain classification results and regression results of multiple alternative boxes output by the local region detector.

The classification results include probability values of the alternative boxes being the detection box for the target object, and the regression results include offsets of the alternative boxes with respect to the detection box corresponding to the template frame.

In an optional example of the embodiments of the present disclosure, the multiple alternative boxes include: K alternative boxes at multiple positions in the detection frame. K is a preset integer which is greater than 1. The length-to-width ratios of the K alternative boxes are different, for example, the length-to-width ratios of the K alternative boxes may include: 1:1, 2:1, 2:1, 3:1, 1:3, etc. The classification results are used for indicating the probability values of whether the K alternative boxes at the multiple positions are the detection box for the target object.

In an optional embodiment of the target detecting method of the present disclosure, after the probability values of whether the multiple alternative boxes are the detection box for the target object are obtained at operation 106, the method further includes: performing normalization processing on the classification results to enable the sum of the probability values of whether the alternative boxes are the detection box for the target object to be 1, so as to facilitate determination on whether the alternative boxes are the detection box for the target object.

In an optional example of the embodiments of the present disclosure, the regression results include the offsets of the K alternative boxes at the multiple positions in the detection frame image respectively with respect to the detection box for the target object in the template frame, where the offsets may include variations in position and size, and the positions may be the position of the center point, or positions of four vertices of a reference box, etc.

If the number of channels of the second characteristic is 4 k times of that of the characteristic of the template frame, the offsets of the alternative boxes respectively with respect to the detection box for the target object in the template frame include, for example, an offset (dx) of the position of the center point in abscissa, an offset (dy) of the position of the center point in ordinate, a variation (dh) in height, and a variation (dw) in width.

In one embodiment of the embodiments of the present disclosure, operation 106 includes: using the classification weight to perform the convolution operation on the characteristic of the detection frame to obtain the classification results of the multiple alternative boxes; and using the regression weight to perform the convolution operation on the characteristic of the detection frame to obtain the regression results of the multiple alternative boxes.

In one optional example, step 106 may be executed by invoking, by a processor, corresponding instructions stored in a memory, and may also be executed by the local region detector run by the processor.

At 108, a detection box for the target object in the detection frame is obtained according to the classification results and regression results of the multiple alternative boxes output by the local region detector.

In an optional example, step 108 may be executed by invoking, by a processor, corresponding instructions stored in a memory, and may also be executed by the obtaining unit run by the processor.

Based on the target detecting method of the embodiments of the disclosure, characteristics of a template frame and a detection frame are separately extracted by means of a neural network, a classification weight and a regression weight of a local region detector are obtained based on the characteristic of the template frame, the characteristic of the detection frame is input into the local region detector to obtain classification results and regression results of multiple alternative boxes output by the local region detector, and a detection box for the target object in the detection frame is obtained according to the classification results and regression results of the multiple alternative boxes output by the local region detector. Based on the embodiments of the present disclosure, similar characteristics of the same target object may be better extracted by using the same neural network or neural networks of the same structure, so that changes in the characteristics of the target object extracted in different frames are small, which facilitates improving accuracy of a target object detection result in a detection frame; a classification weight and a regression weight of a local region detector are obtained based on the characteristic of the template frame, and the local region detector obtains classification results and regression results of multiple alternative boxes of the detection frame to obtain a detection box for the target object in the detection frame, where changes in the position and size of the target object are better estimated, and the position of the target object in the detection frame is found more accurately, so that the speed and accuracy in target tracking are improved, the tracking effect is good, and the speed is high.

According to the embodiments of the present disclosure, based on the template frame, the local region detector is able to quickly generate a large amount of alternative boxes from the detection frame and obtain the offsets of the K alternative boxes at the multiple positions in the detection frame respectively with respect to the detection box for the target object in the template frame, where changes in the position and size of the target object are better estimated, and the position of the target object in the detection frame is found more accurately, so that the speed and accuracy in target tracking are improved, the tracking effect is good, and the speed is high.

In another embodiment of the target detecting method of the present disclosure, the method further includes:

extracting, by means of the neural network, characteristics of at least one other detection frame which is after the detection frame in timing in a video sequence;

sequentially inputting the characteristics of the at least one other detection frame into the local region detector to sequentially obtain multiple alternative boxes in the at least one other detection frame and classification results and regression results of the alternative boxes output by the local region detector, that is: sequentially performing operation 106 on the characteristics of at least one other detection frame; and sequentially obtaining a detection box for the target object in the at least one other detection frame according to the classification results and regression results of the multiple alternative boxes of the at least one other detection frame, that is: sequentially performing operation the classification results and regression results of the multiple alternative boxes of at least one other detection frame.

In yet another embodiment of the target detecting method of the present disclosure, if the detection frame is the regional image which may include the target object in the current frame on which the target object detection needs to be performed, the method further includes: taking a center point of the template frame as the center point, capturing the regional image with a length and/or width correspondingly greater than the image length and/or width of the template frame in the current frame as the detection frame.

Figure 2:
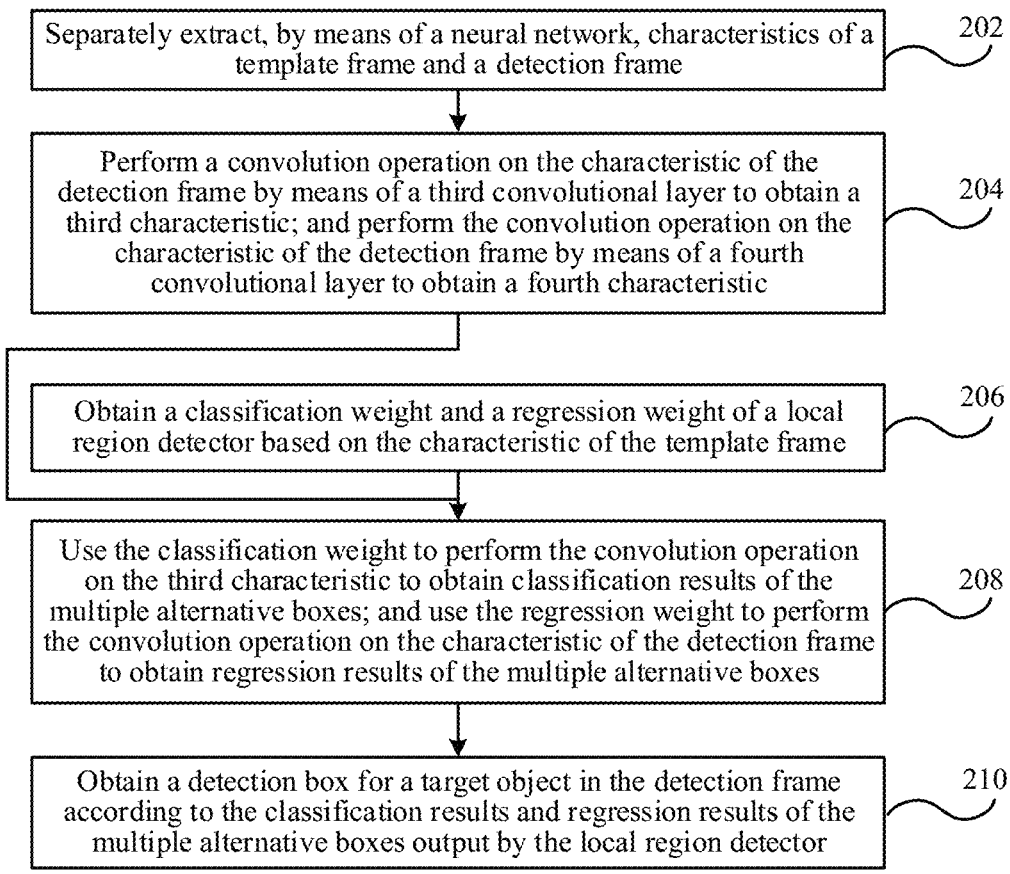
FIG. 2 is a flow chart of another embodiment of a target detecting method of the present disclosure.

FIG. 2 is a flow chart of another embodiment of a target detecting method of the present disclosure. As shown in FIG. 2, the target detecting method of the present embodiment includes the following steps.

At 202, characteristics of a template frame and a detection frame are separately extracted by means of a neural network.

The template frame is a detection box image of a target object, and the template frame is smaller than the detection frame in image size. The detection frame is a current frame on which target object detection needs to be performed, or a regional image which may include the target object in the current frame. The template frame is a frame which is before the detection frame in detection timing in the video sequence and determined by the detection box for the target object.

In one embodiment of the embodiments of the present disclosure, at operation 202, the characteristics of the template frame and the detection frame may be separately extracted by means of the same neural network; or the characteristics of the template frame and the detection frame may be respectively extracted by means of different neural networks of the same structure.

In an optional example, step 202 may be executed by invoking, by a processor, corresponding instructions stored in a memory, and may also be executed by the neural network run by the processor.

At 204, the convolution operation is performed on the characteristic of the detection frame by means of a third convolutional layer to obtain a third characteristic, the number of channels of the third characteristic being identical to that of the characteristic of the detection frame; and the convolution operation is performed on the characteristic of the detection frame by means of a fourth convolutional layer to obtain a fourth characteristic, the number of channels of the fourth characteristic being identical to that of the characteristic of the detection frame.

In an optional example, step 204 may be executed by invoking, by a processor, corresponding instructions stored in a memory, and may also be executed by the third convolutional layer and the fourth convolutional layer run by the processor.

At 206, a classification weight and a regression weight of a local region detector are obtained based on the characteristic of the template frame.

In one embodiment of the embodiments of the present disclosure, a convolution operation is performed on the characteristic of the template frame by means of a first convolutional layer, where a first characteristic obtained by the convolution operation is used as the classification weight of the local region detector.

In one embodiment of the embodiments of the present disclosure, a convolution operation is performed on the characteristic of the template frame by means of a second convolutional layer, where a second characteristic obtained by the convolution operation is used as the regression weight of the local region detector.

No executing order limit exists between operations 206 and 204, i.e., they can be executed at the same time, or can also be executed at any time order.

In an optional example, step 206 may be executed by invoking, by a processor, corresponding instructions stored in a memory, and may also be executed by the first convolutional layer and the second convolutional layer run by the processor.

At 208, the classification weight is used to perform the convolution operation on the third characteristic to obtain the classification results of the multiple alternative boxes; and the regression weight is used to perform the convolution operation on the fourth characteristic to obtain the regression results of the multiple alternative boxes.

The classification results include probability values of the alternative boxes being the detection box for the target object, and the regression results include offsets of the alternative boxes with respect to the detection box corresponding to the template frame.

In one optional example, step 208 may be executed by invoking, by a processor, corresponding instructions stored in a memory, and may also be executed by the local region detector run by the processor.

At 210, a detection box for the target object in the detection frame is obtained according to the classification results and regression results of the multiple alternative boxes output by the local region detector.

In an optional example, step 210 may be executed by invoking, by a processor, corresponding instructions stored in a memory, and may also be executed by the obtaining unit run by the processor.

In one embodiment of the embodiments of the present disclosure, operation 108 or 210 includes: selecting one alternative box from the multiple alternative boxes according to the classification results and the regression results, and performing regression on the selected alternative box according to an offset of the selected alternative box to obtain the detection box for the target object in the detection frame.

In an optional example therein, selecting one alternative box from the multiple alternative boxes according to the classification results and the regression results is implemented in the following mode: selecting one alternative box from the multiple alternative boxes according to weight coefficients of the classification results and the regression results, for example, calculating an overall score from the sum of product of the probability value of the alternative box and the weight coefficient of the classification result and the product of the offset and the weight coefficient of the regression result according to the weight coefficients of the classification results and the regression results, and selecting one alternative box from the multiple alternative boxes according to the overall scores of the multiple alternative boxes.

In another optional example therein, after the regression results are obtained in the embodiments, the method further includes: adjusting the probability values of the alternative boxes according to the variations in position and size in the regression results, for example, adjusting the probability values of the alternative boxes according to the variations in position and size in the regression results. For example, the probability value of the alternative box having a greater variation in position (i.e., a greater position shift) and a greater variation in size (i.e., a greater shape change) is punished to reduce the probability value. Correspondingly, in the example, selecting one alternative box from the multiple alternative boxes according to the classification results and the regression results is implemented in the following mode: selecting one alternative box from the multiple alternative boxes according to the adjusted classification results, for example, selecting the alternative box having the highest probability value from the multiple alternative boxes according to the adjusted probability values.

In an optional example, the operation of adjusting the probability values of the alternative boxes according to the variations in position and size in the regression results may be executed by invoking, by a processor, corresponding instructions stored in a memory, and may also be executed by an adjusting unit run by the processor.

Figure 3:
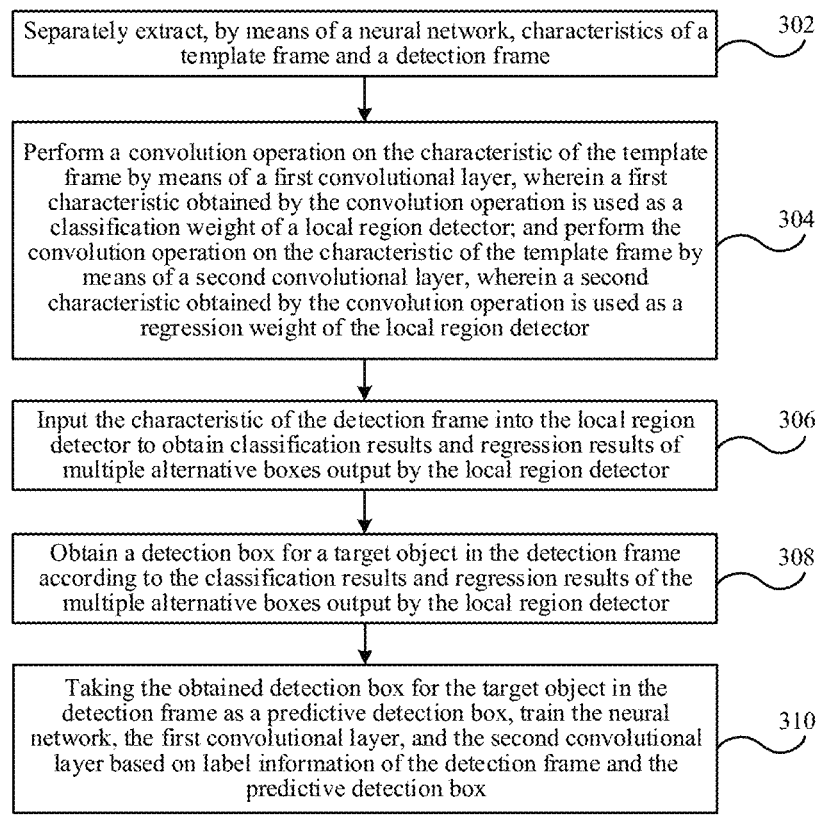
FIG. 3 is a flow chart of an embodiment of a target detecting network training method of the present disclosure.

FIG. 3 is a flow chart of an embodiment of a target detecting network training method of the present disclosure. The target detecting network according to the embodiments of the present disclosure includes a neural network, a first convolutional layer, and a second convolutional layer according to the embodiments of the present disclosure. As shown in FIG. 3, the training method of the present embodiment includes:

At 302, characteristics of a template frame and a detection frame are separately extracted by means of a neural network.

The template frame is a detection box image of a target object, and the template frame is smaller than the detection frame in image size. The detection frame is a current frame on which target object detection needs to be performed, or a regional image which may include the target object in the current frame. The template frame is a frame which is before the detection frame in detection timing in the video sequence and determined by the detection box for the target object.

In one embodiment of the embodiments of the present disclosure, at operation 302, the characteristics of the template frame and the detection frame may be separately extracted by means of the same neural network; or the characteristics of the template frame and the detection frame may be respectively extracted by means of different neural networks of the same structure.

In an optional example, step 302 may be executed by invoking, by a processor, corresponding instructions stored in a memory, and may also be executed by the neural network run by the processor.

At 304, a convolution operation is performed on the characteristic of the template frame by means of a first convolutional layer, where a first characteristic obtained by the convolution operation is used as a classification weight of a local region detector; and the convolution operation is performed on the characteristic of the template frame by means of a second convolutional layer, where a second characteristic obtained by the convolution operation is used as a regression weight of the local region detector.

In an optional example, step 304 may be executed by invoking, by a processor, corresponding instructions stored in a memory, and may also be executed by the first convolutional layer and the second convolutional layer run by the processor.

At 306, the characteristic of the detection frame is input into the local region detector to obtain classification results and regression results of multiple alternative boxes output by the local region detector.

The classification results include probability values of the alternative boxes being the detection box for the target object, and the regression results include offsets of the alternative boxes with respect to the detection box corresponding to the template frame.

In one embodiment of the embodiments of the present disclosure, operation 306 includes: using the classification weight to perform the convolution operation on the characteristic of the detection frame to obtain the classification results of the multiple alternative boxes; and using the regression weight to perform the convolution operation on the characteristic of the detection frame to obtain the regression results of the multiple alternative boxes.

In one optional example, step 306 may be executed by invoking, by a processor, corresponding instructions stored in a memory, and may also be executed by a region detector run by the processor.

At 308, a detection box for the target object in the detection frame is obtained according to the classification results and regression results of the multiple alternative boxes output by the local region detector.

In an optional example, step 308 may be executed by invoking, by a processor, corresponding instructions stored in a memory, and may also be executed by the obtaining unit run by the processor.

At 310, taking the obtained detection box for the target object in the detection frame as a predictive detection box, the neural network, the first convolutional layer, and the second convolutional layer are trained based on label information of the detection frame and the predictive detection box.

In an optional example, step 310 may be executed by invoking, by a processor, corresponding instructions stored in a memory, and may also be executed by a training unit run by the processor.

Based on the target detecting network training method of the embodiments of the disclosure, characteristics of a template frame and a detection frame are separately extracted by means of a neural network, a classification weight and a regression weight of a local region detector are obtained based on the characteristic of the template frame, the characteristic of the detection frame is input into the local region detector to obtain classification results and regression results of multiple alternative boxes output by the local region detector, a detection box for the target object in the detection frame is obtained according to the classification results and regression results of the multiple alternative boxes output by the local region detector, and a target detecting network is trained based on label information of the detection frame and a predictive detection box. Based on the trained target detecting network in the embodiments of the present disclosure, similar characteristics of the same target object may be better extracted by using the same neural network or neural networks of the same structure, so that changes in the characteristics of the target object extracted in different frames are small, which facilitates improving accuracy of a target object detection result in a detection frame; a classification weight and a regression weight of a local region detector are obtained based on the characteristic of the template frame, and the local region detector obtains classification results and regression results of multiple alternative boxes of the detection frame to obtain a detection box for the target object in the detection frame, where changes in the position and size of the target object are better estimated, and the position of the target object in the detection frame is found more accurately, so that the speed and accuracy in target tracking are improved, the tracking effect is good, and the speed is high.

In another embodiment of the training method of the present disclosure, the method further includes: extracting, by means of the neural network, characteristics of at least one other detection frame which is after the detection frame in timing in a video sequence;

sequentially inputting the characteristics of the at least one other detection frame into the local region detector to sequentially obtain multiple alternative boxes in the at least one other detection frame and classification results and regression results of the alternative boxes output by the local region detector, that is: sequentially performing operation 306 on the characteristics of at least one other detection frame; and sequentially obtaining a detection box for the target object in the at least one other detection frame according to the classification results and regression results of the multiple alternative boxes of the at least one other detection frame, that is: sequentially performing operation 308 on the classification results and regression results of the multiple alternative boxes of at least one other detection frame.

In yet another embodiment of the training method of the present disclosure, if the detection frame is the regional image which may include the target object in the current frame on which the target object detection needs to be performed, the method further includes: taking a center point of the template frame as the center point, capturing the regional image with a length and/or width correspondingly greater than the image length and/or width of the template frame in the current frame as the detection frame.

Figure 4:
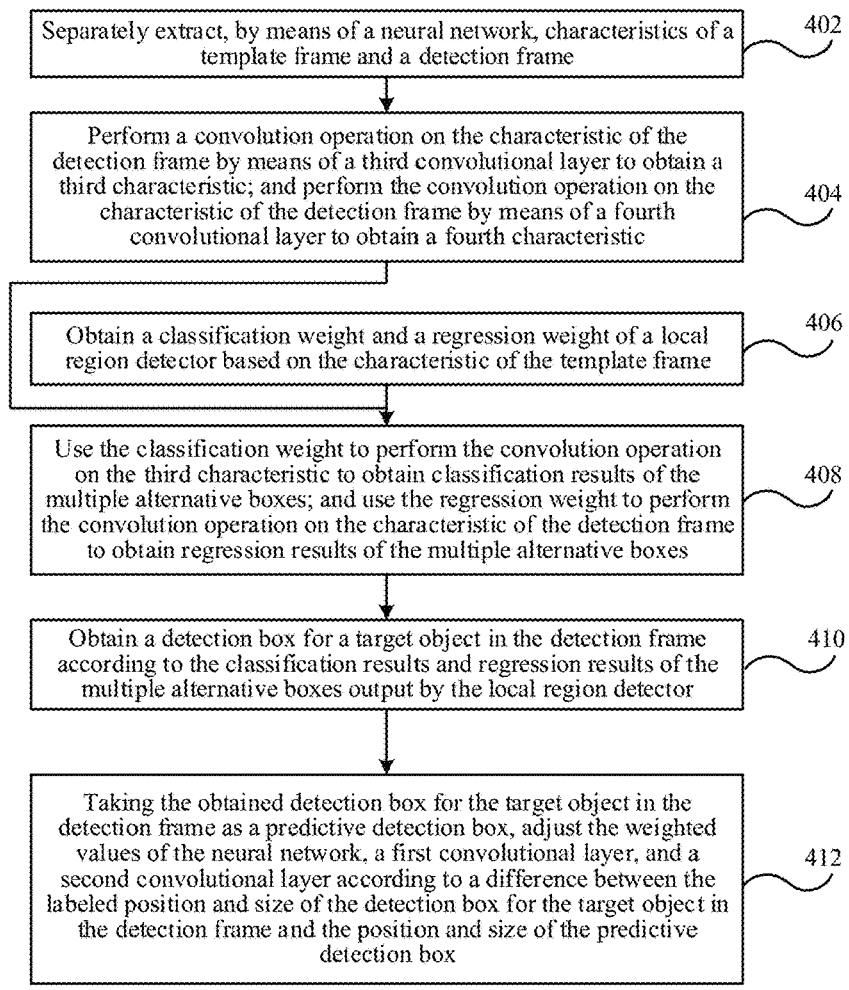
FIG. 4 is a flow chart of another embodiment of a target detecting network training method of the present disclosure.

FIG. 4 is a flow chart of another embodiment of a target detecting network training method of the present disclosure. The target detecting network according to the embodiments of the present disclosure includes the neural network, a first convolutional layer, a second convolutional layer, a third convolutional layer, and a fourth convolutional layer according to the embodiments of the present disclosure. As shown in FIG. 4, the training method of the present embodiment includes:

At 402, characteristics of a template frame and a detection frame are separately extracted by means of a neural network.

The template frame is a detection box image of a target object, and the template frame is smaller than the detection frame in image size. The detection frame is a current frame on which target object detection needs to be performed, or a regional image which may include the target object in the current frame. The template frame is a frame which is before the detection frame in detection timing in the video sequence and determined by the detection box for the target object.

In one embodiment of the embodiments of the present disclosure, at operation 402, the characteristics of the template frame and the detection frame may be separately extracted by means of the same neural network; or the characteristics of the template frame and the detection frame may be respectively extracted by means of different neural networks of the same structure.

In an optional example, step 402 may be executed by invoking, by a processor, corresponding instructions stored in a memory, and may also be executed by the neural network run by the processor.

At 404, the convolution operation is performed on the characteristic of the detection frame by means of a third convolutional layer to obtain a third characteristic, the number of channels of the third characteristic being identical to that of the characteristic of the detection frame; and the convolution operation is performed on the characteristic of the detection frame by means of a fourth convolutional layer to obtain a fourth characteristic, the number of channels of the fourth characteristic being identical to that of the characteristic of the detection frame.

In an optional example, step 404 may be executed by invoking, by a processor, corresponding instructions stored in a memory, and may also be executed by the third convolutional layer and the fourth convolutional layer run by the processor.

At 406, a convolution operation is performed on the characteristic of the template frame by means of a first convolutional layer, where a first characteristic obtained by the convolution operation is used as a classification weight of a local region detector; and the convolution operation is performed on the characteristic of the template frame by means of a second convolutional layer, where a second characteristic obtained by the convolution operation is used as a regression weight of the local region detector.

No executing order limit exists between operations 406 and 404, i.e., they can be executed at the same time, or can also be executed at any time order.

In an optional example, step 406 may be executed by invoking, by a processor, corresponding instructions stored in a memory, and may also be executed by the first convolutional layer and the second convolutional layer run by the processor.

At 408, the classification weight is used to perform the convolution operation on the third characteristic to obtain the classification results of the multiple alternative boxes; and the regression weight is used to perform the convolution operation on the fourth characteristic to obtain the regression results of the multiple alternative boxes.

The classification results include probability values of the alternative boxes being the detection box for the target object, and the regression results include offsets of the alternative boxes with respect to the detection box corresponding to the template frame.

In one optional example, step 408 may be executed by invoking, by a processor, corresponding instructions stored in a memory, and may also be executed by the local region detector run by the processor.

At 410, a detection box for the target object in the detection frame is obtained according to the classification results and regression results of the multiple alternative boxes output by the local region detector.

In an optional example, step 410 is performed by a processor by invoking a corresponding instruction stored in a memory, or is performed by a first feature extraction unit 701 run by the processor.

At 412, taking the obtained detection box for the target object in the detection frame as a predictive detection box, the weighted values of the neural network, the first convolutional layer, and the second convolutional layer are adjusted according to a difference between the labeled position and size of the detection box for the target object in the detection frame and the position and size of the predictive detection box.

In an optional example, step 412 may be executed by invoking, by a processor, corresponding instructions stored in a memory, and may also be executed by a training unit run by the processor.

In one embodiment of the embodiments of the present disclosure, operation 308 or 410 includes: selecting one alternative box from the multiple alternative boxes according to the classification results and the regression results, and performing regression on the selected alternative box according to an offset of the selected alternative box to obtain the detection box for the target object in the detection frame.

In an optional example therein, selecting one alternative box from the multiple alternative boxes according to the classification results and the regression results is implemented in the following mode: selecting one alternative box from the multiple alternative boxes according to weight coefficients of the classification results and the regression results, for example, calculating an overall score from the sum of product of the probability value of the alternative box and the weight coefficient of the classification result and the product of the offset and the weight coefficient of the regression result according to the weight coefficients of the classification results and the regression results, and selecting the alternative box having a high probability value and a small offset from the multiple alternative boxes according to the overall scores of the multiple alternative boxes.

In another optional example therein, after the regression results are obtained in the embodiments, the method further includes: adjusting the probability values of the alternative boxes according to the variations in position and size in the regression results, for example, adjusting the probability values of the alternative boxes according to the variations in position and size in the regression results. Correspondingly, in the example, selecting one alternative box from the multiple alternative boxes according to the classification results and the regression results is implemented in the following mode: selecting one alternative box from the multiple alternative boxes according to the adjusted classification results, for example, selecting the alternative box having the highest probability value from the multiple alternative boxes according to the adjusted probability values.

In an optional example, the operation of adjusting the probability values of the alternative boxes according to the variations in position and size in the regression results may be executed by invoking, by a processor, corresponding instructions stored in a memory, and may also be executed by an adjusting unit run by the processor.

In one embodiment of the embodiments of the present disclosure, operation 308 or 410 includes: selecting one alternative box from the multiple alternative boxes according to the classification results and the regression results, and performing regression on the selected alternative box according to an offset of the selected alternative box to obtain the detection box for the target object in the detection frame.

In an optional example therein, selecting one alternative box from the multiple alternative boxes according to the classification results and the regression results is implemented in the following mode: selecting one alternative box from the multiple alternative boxes according to weight coefficients of the classification results and the regression results, for example, calculating an overall score from the probability values and the offsets of the alterative boxes according to the weight coefficients of the classification results and the regression results, and selecting one alternative box from the multiple alternative boxes according to the overall scores of the multiple alternative boxes.

In another optional example therein, after the regression results are obtained in the embodiments, the method further includes: adjusting the probability values of the alternative boxes according to the variations in position and size in the regression results, for example, adjusting the probability values of the alternative boxes according to the variations in position and size in the regression results. For example, the probability value of the alternative box having a greater variation in position (i.e., a greater position shift) and a greater variation in size (i.e., a greater shape change) is punished to reduce the probability value. Correspondingly, in the example, selecting one alternative box from the multiple alternative boxes according to the classification results and the regression results is implemented in the following mode: selecting one alternative box from the multiple alternative boxes according to the adjusted classification results, for example, selecting the alternative box having the highest probability value from the multiple alternative boxes according to the adjusted probability values.

In the embodiments of the present disclosure, the local region detector includes the third convolutional layer, the fourth convolutional layer, and two convolution operation units. After the local region detector is combined with the first convolutional layer and the second convolutional layer, the formed local region detector is also referred to as a regional proposal network.

Any target detecting method or target detecting network training method provided in the embodiments of the present disclosure is executed by any appropriate device having data processing capability, including, but not limited to, a terminal device, a server and the like. Alternatively, any target detecting method or target detecting network training method provided in the embodiments of the present disclosure is executed by a processor, for example, any target detecting method or target detecting network training method mentioned in the embodiments of the present disclosure is executed by the processor by invoking a corresponding instruction stored in a memory. Details are not described below again.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as a Read-Only Memory (ROM), a Random Access Memory (RAM), a magnetic disk, or an optical disk.

Figure 5:
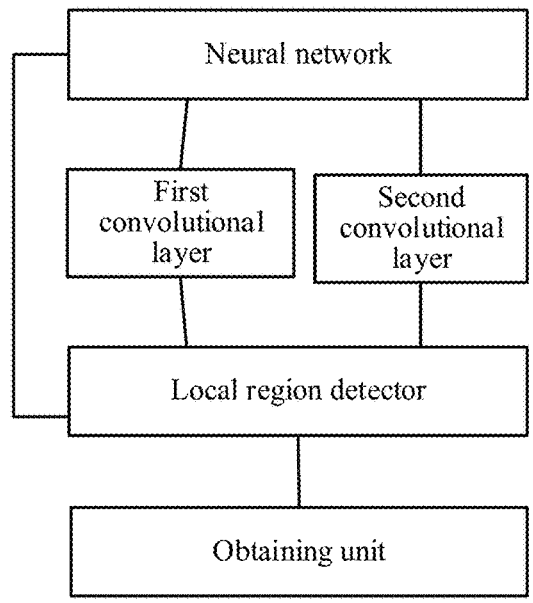
FIG. 5 is a schematic structural diagram of an embodiment of a target detecting apparatus according to the present disclosure.

FIG. 5 is a schematic structural diagram of an embodiment of a target detecting apparatus according to the present disclosure. The target detecting apparatus of the embodiments of the present disclosure is used for implementing the embodiments of the target detecting method of the present disclosure. As illustrated in FIG. 5, the target detecting apparatus of the embodiments includes: a neural network, a first convolutional layer, a second convolutional layer, a local region detector, and an obtaining unit.

The neural network is configured to separately extract characteristics of a template frame and a detection frame, where the template frame is a detection box image of a target object, and the template frame is smaller than the detection frame in image size. The template frame is a detection box image of a target object, and the template frame is smaller than the detection frame in image size. The detection frame is a current frame on which target object detection needs to be performed, or a regional image which may include the target object in the current frame. The template frame is a frame which is before the detection frame in detection timing in the video sequence and determined by the detection box for the target object. The neural network for extracting the characteristics of the template frame and the detection frame may be the same neural network, or different neural networks of the same structure.

The first convolutional layer is configured to perform a convolution operation on the characteristic of the template frame, where a first characteristic obtained by the convolution operation is used as the classification weight of the local region detector.

The second convolutional layer is configured to perform the convolution operation on the characteristic of the template frame, where a second characteristic obtained by the convolution operation is used as the regression weight of the local region detector.

The local region detector is configured to output classification results and regression results of multiple alternative boxes according to the characteristic of detection frame, where the classification results include probability values of the alternative boxes being the detection box for the target object, and the regression results include offsets of the alternative boxes with respect to the detection box corresponding to the template frame.

The obtaining unit is configured to obtain the detection box for the target object in the detection frame according to the classification results and regression results of the multiple alternative boxes output by the local region detector.

Based on the target detecting apparatus of the embodiments of the disclosure, characteristics of a template frame and a detection frame are separately extracted by means of a neural network, a classification weight and a regression weight of a local region detector are obtained based on the characteristic of the template frame, the characteristic of the detection frame is input into the local region detector to obtain classification results and regression results of multiple alternative boxes output by the local region detector, and a detection box for the target object in the detection frame is obtained according to the classification results and regression results of the multiple alternative boxes output by the local region detector. Based on the embodiments of the present disclosure, similar characteristics of the same target object may be better extracted by using the same neural network or neural networks of the same structure, so that changes in the characteristics of the target object extracted in different frames are small, which facilitates improving accuracy of a target object detection result in a detection frame; a classification weight and a regression weight of a local region detector are obtained based on the characteristic of the template frame, and the local region detector obtains classification results and regression results of multiple alternative boxes of the detection frame to obtain a detection box for the target object in the detection frame, where changes in the position and size of the target object are better estimated, and the position of the target object in the detection frame is found more accurately, so that the speed and accuracy in target tracking are improved, the tracking effect is good, and the speed is high.

In one embodiment of the embodiments of the target detecting apparatus of the present disclosure, the local region detector is configured to: use the classification weight to perform the convolution operation on the characteristic of the detection frame to obtain the classification results of the multiple alternative boxes; and use the regression weight to perform the convolution operation on the characteristic of the detection frame to obtain the regression results of the multiple alternative boxes.

Figure 6:
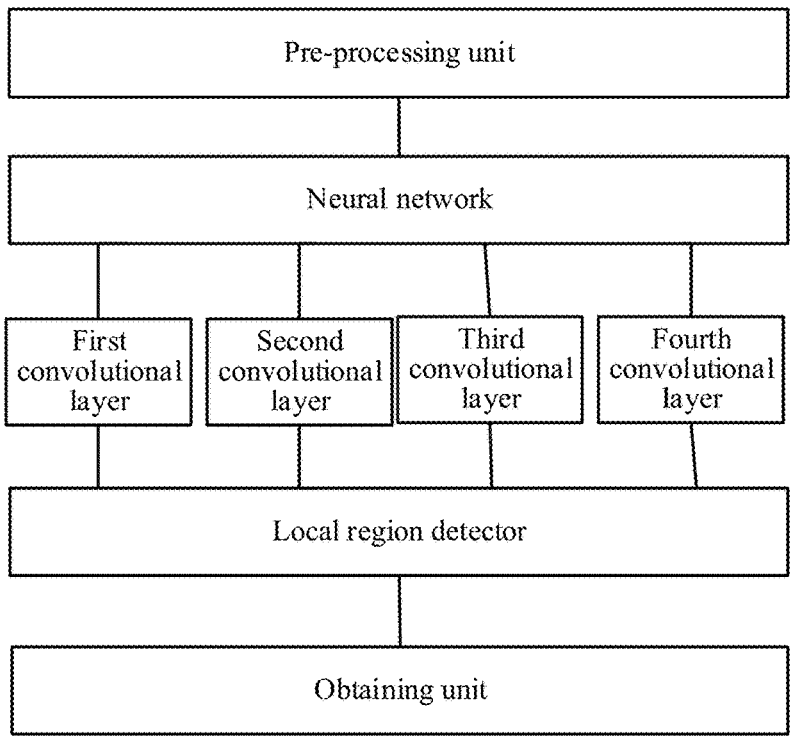
FIG. 6 is a schematic structural diagram of another embodiment of a target detecting apparatus according to the present disclosure.

If the detection frame is the regional image which may include the target object in the current frame on which the target object detection needs to be performed, in another embodiment of the target detecting apparatus of the present disclosure, the apparatus further includes: a pre-processing unit, configured to, taking a center point of the template frame as the center point, capture the regional image with a length and/or width correspondingly greater than the image length and/or width of the template frame in the current frame as the detection frame. FIG. 6 is a schematic structural diagram of another embodiment of a target detecting apparatus according to the present disclosure.

In addition, with reference to FIG. 6 again, in yet another embodiment of the target detecting apparatus of the present disclosure, the apparatus further includes: a third convolutional layer, configured to perform the convolution operation on the characteristic of the detection frame to obtain a third characteristic, the number of channels of the third characteristic being identical to that of the characteristic of the detection frame. Correspondingly, in the embodiments, the local region detector is configured to use the classification weight to perform the convolution operation on the third characteristic.

In addition, with reference to FIG. 6 again, in still another embodiment of the target detecting apparatus of the present disclosure, the apparatus further includes: a fourth convolutional layer, configured to perform the convolution operation on the characteristic of the detection frame to obtain a fourth characteristic, the number of channels of the fourth characteristic being identical to that of the characteristic of the detection frame. Correspondingly, in the embodiments, the local region detector is configured to use the regression weight to perform the convolution operation on the fourth characteristic.

In another embodiment of the embodiments of the target detecting apparatus of the present disclosure, the obtaining unit is configured to: select one alternative box from the multiple alternative boxes according to the classification results and the regression results, and perform regression on the selected alternative box according to an offset of the selected alternative box to obtain the detection box for the target object in the detection frame.

Exemplarily, when selecting one alternative box from the multiple alternative boxes according to the classification results and the regression results, the obtaining unit is configured to: select one alternative box from the multiple alternative boxes according to weight coefficients of the classification results and the regression results.

In addition, with reference to FIG. 6 again, in yet another embodiment of the target detecting apparatus of the present disclosure, the apparatus further includes: an adjusting unit, configured to adjust the classification results according to the regression results. Correspondingly, when selecting one alternative box from the multiple alternative boxes according to the classification results and the regression results, the obtaining unit is configured to: select one alternative box from the multiple alternative boxes according to the adjusted classification results.

Figure 7:
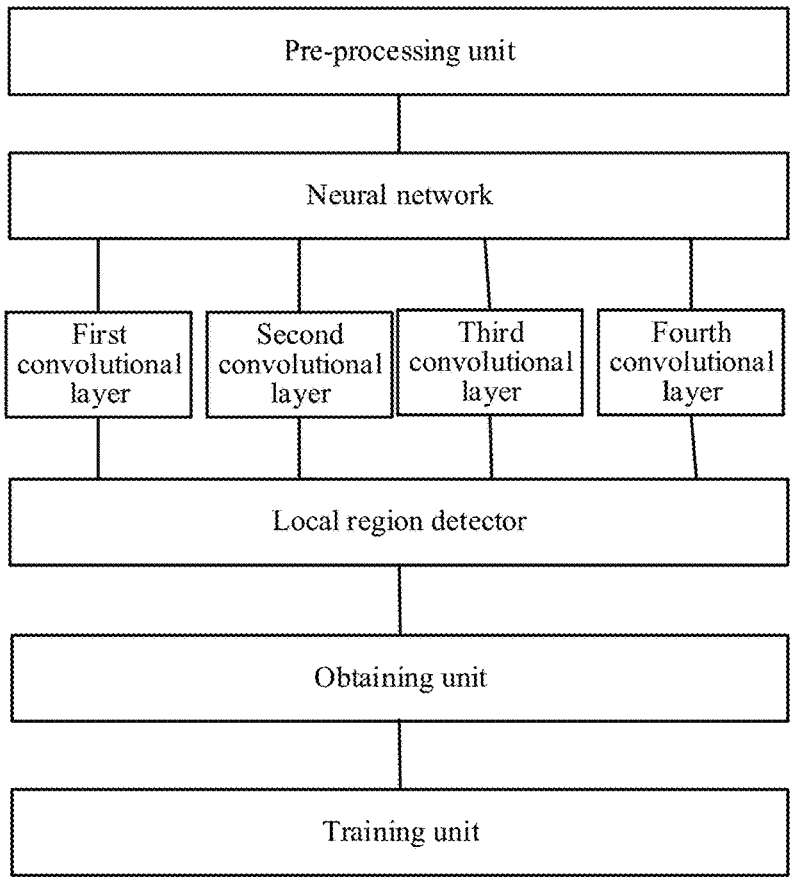
FIG. 7 is a schematic structural diagram of yet another embodiment of a target detecting apparatus according to the present disclosure.

FIG. 7 is a schematic structural diagram of still another embodiment of a target detecting apparatus according to the present disclosure. The target detecting apparatus of the embodiments is used for implementing the embodiments of the target detecting network training method in FIG. 3 or 4 of the present disclosure. As illustrated in FIG. 7, compared with the embodiments illustrated in FIG. 5 or 6, the target detecting apparatus of the embodiments further includes: a training unit, configured to, taking the obtained detection box for the target object in the detection frame as a predictive detection box, train the neural network, the first convolutional layer, and the second convolutional layer based on label information of the detection frame and the predictive detection box.

In one implementation, the label information of the detection frame includes: a labeled position and size of the detection box for the target object in the detection frame. Correspondingly, in the implementation, the training unit is configured to adjust the weighted values of the neural network, the first convolutional layer, and the second convolutional layer according to a difference between the labeled position and size of the detection box and the position and size of the predictive detection box.

Based on the embodiments of the disclosure, characteristics of a template frame and a detection frame are separately extracted by means of a neural network, a classification weight and a regression weight of a local region detector are obtained based on the characteristic of the template frame, the characteristic of the detection frame is input into the local region detector to obtain classification results and regression results of multiple alternative boxes output by the local region detector, a detection box for the target object in the detection frame is obtained according to the classification results and regression results of the multiple alternative boxes output by the local region detector, and a target detecting network is trained based on label information of the detection frame and a predictive detection box. Based on the trained target detecting network in the embodiments of the present disclosure, similar characteristics of the same target object may be better extracted by using the same neural network or neural networks of the same structure, so that changes in the characteristics of the target object extracted in different frames are small, which facilitates improving accuracy of a target object detection result in a detection frame; a classification weight and a regression weight of a local region detector are obtained based on the characteristic of the template frame, and the local region detector obtains classification results and regression results of multiple alternative boxes of the detection frame to obtain a detection box for the target object in the detection frame, where changes in the position and size of the target object are better estimated, and the position of the target object in the detection frame is found more accurately, so that the speed and accuracy in target tracking are improved, the tracking effect is good, and the speed is high.

Figure 8:
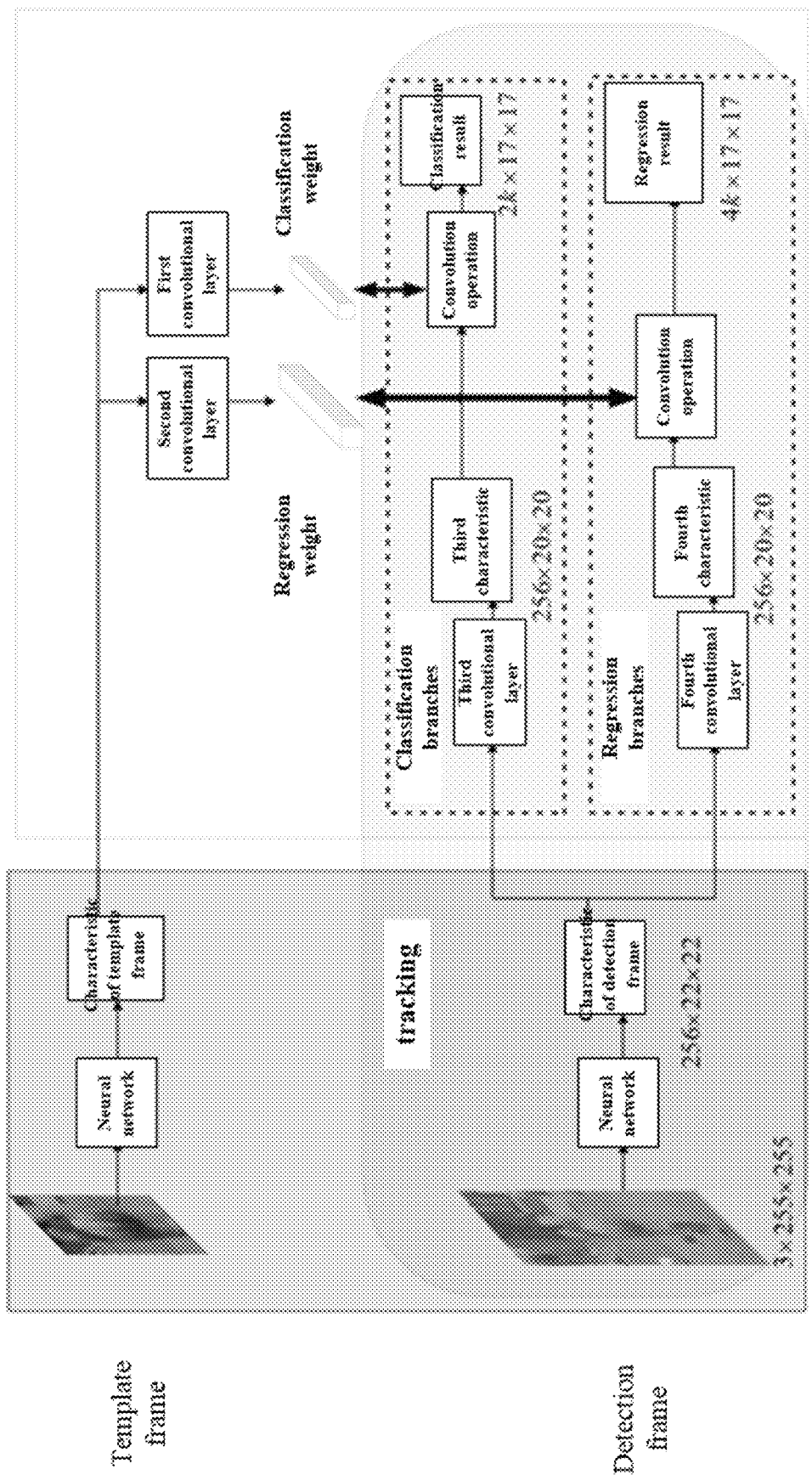
FIG. 8 is a schematic structural diagram of an application embodiment of a target detecting apparatus according to the present disclosure.
Figure 9:
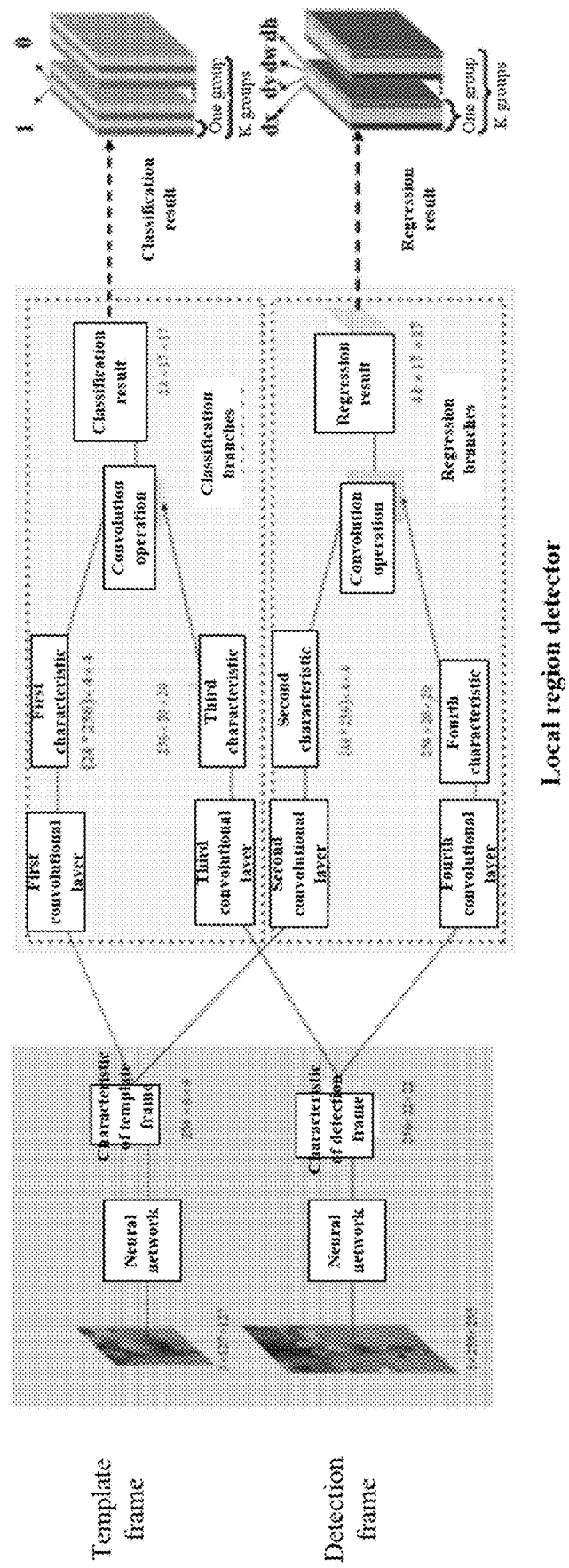
FIG. 9 is a schematic structural diagram of another application embodiment of a target detecting apparatus according to the present disclosure.

FIG. 8 is a schematic structural diagram of an application embodiment of a target detecting apparatus according to the present disclosure. FIG. 9 is a schematic structural diagram of another application embodiment of a target detecting apparatus according to the present disclosure. In FIGS. 8 and 9, in L×M×N (for example, 256×20×20), L represents the number of channels, and M and N respectively represent the height (i.e., length) and width.

The embodiments of the present disclosure further provide an electronic device, including the target detecting apparatus according to any of the foregoing embodiments of the present disclosure.

The embodiments of the present application further provide another electronic device, including: a memory, configured to store executable instructions; and a processor, configured to communicate with the memory to execute the executable instructions so as to complete operations of the target detecting method or target detecting network training method according to any one of the foregoing embodiments of the present disclosure.

Figure 10:
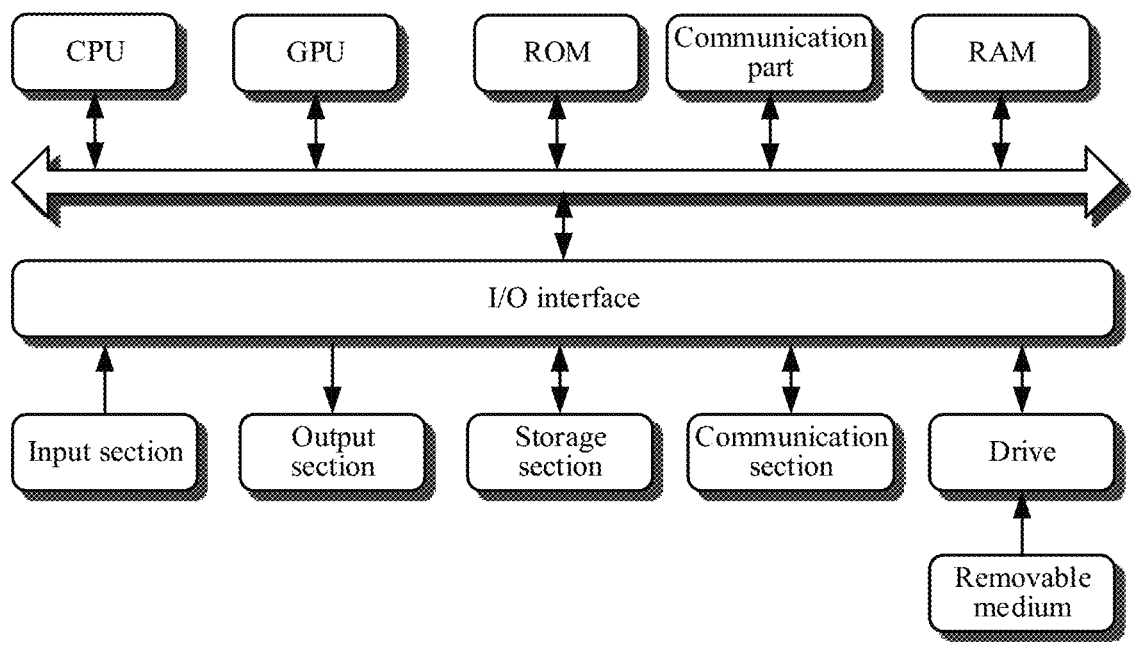
FIG. 10 is a schematic structural diagram of an application embodiment of an electronic device according to the present disclosure.

FIG. 10 is a schematic structural diagram of an application embodiment of an electronic device according to the present disclosure. Referring to FIG. 10 below, a schematic structural diagram of an electronic device suitable for implementing a terminal device or a server according to the embodiments of the present application is shown. As shown in FIG. 10, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card, which may include, but is not limited to, an Infiniband (IB) network card, and the processor may communicate with the ROM and/or the RAM to execute executable instructions, is connected to the communication part through the bus, and communicates with other target devices via the communication part, thereby completing operations corresponding to any method provided by the embodiments of the present application, for example, separately extracting, by means of a neural network, characteristics of a template frame and a detection frame, where the template frame is a detection box image of a target object, and the template frame is smaller than the detection frame in image size; obtaining a classification weight and a regression weight of a local region detector based on the characteristic of the template frame; inputting the characteristic of the detection frame into the local region detector to obtain classification results and regression results of multiple alternative boxes output by the local region detector; and obtaining a detection box for the target object in the detection frame according to the classification results and regression results of the multiple alternative boxes output by the local region detector; for another example, separately extracting, by means of a neural network, characteristics of a template frame and a detection frame, where the template frame is a detection box image of a target object, and the template frame is smaller than the detection frame in image size; increasing channels of the characteristic of the template frame by means of a first convolutional convolutional layer to obtain a first characteristic as a classification weight of a local region detector; increasing channels of the characteristic of the template frame by means of a second convolutional layer to obtain a second characteristic as a regression weight of the local region detector; increasing channels of the characteristic of the template frame by means of a second convolutional layer to obtain a second characteristic as a regression weight of the local region detector; inputting the characteristic of the detection frame into the local region detector to obtain classification results and regression results of multiple alternative boxes output by the local region detector; obtaining a detection box for the target object in the detection frame according to the classification results and regression results of the multiple alternative boxes output by the local region detector; and taking the obtained detection box for the target object in the detection frame as a predictive detection box, training the neural network, the first convolutional layer, and the second convolutional layer based on label information of the detection frame and the predictive detection box.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any method of this disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture shown in FIG. 10 is merely an optional implementation. During specific practice, the number and types of the components in FIG. 10 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

In addition, the embodiments of this disclosure further provide a computer storage medium, configured to store computer-readable instructions. When the instructions are executed, the operations of the target detecting method or the target detecting network training method according to any one of the foregoing embodiments of this disclosure are implemented.

In addition, the embodiments of this disclosure further provide a computer program, including computer-readable instructions. When the computer-readable instructions run in a device, a processor in the device execute executable instructions for implementing steps in the video target detecting method or the target detecting network training method according to any one of the foregoing embodiments of this disclosure.

According to the embodiments of the present disclosure, single target tracking is implemented, for example, in a multi-target tracking system, target tracking is not performed in every frame, but at a fixed detection interval, for example, every 10 frames, and in the intermediate 9 frames, the position of a target in the intermediate frames is determined by means of single target tracking. Because the algorithm speed of the embodiments of the present disclosure is faster, the multi-target tracking system is able to implement tracking more quickly as a whole, and a better effect is achieved.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as a Read-Only Memory (ROM), a Random Access Memory (RAM), a magnetic disk, or an optical disk.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure may be implemented in many manners. For example, the methods and apparatuses of the present disclosure are implemented with software, hardware, firmware, or any combination of software, hardware, and firmware. Unless otherwise specially stated, the foregoing sequences of steps of the methods are merely for description, and are not intended to limit the steps of the methods of this disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A target detecting method, comprising:
separately extracting, by means of a neural network, characteristics of a template frame and a detection frame, wherein the template frame is a detection box image of a target object, and the template frame is smaller than the detection frame in image size;
obtaining a classification weight and a regression weight of a local region detector based on the characteristic of the template frame;
inputting the characteristic of the detection frame into the local region detector to obtain classification results and regression results of multiple alternative boxes output by the local region detector; and
obtaining a detection box for the target object in the detection frame according to the classification results and regression results of the multiple alternative boxes output by the local region detector.

2. The method according to claim 1, further comprising:
extracting, by means of the neural network, characteristics of at least one other detection frame which is after the detection frame in timing in a video sequence;
sequentially inputting the characteristics of the at least one other detection frame into the local region detector to sequentially obtain multiple alternative boxes in the at least one other detection frame and classification results and regression results of the alternative boxes output by the local region detector; and
sequentially obtaining a detection box for the target object in the at least one other detection frame according to the classification results and regression results of the multiple alternative boxes of the at least one other detection frame.

3. The method according to claim 1, wherein separately extracting, by means of the neural network, characteristics of the template frame and the detection frame comprises:
separately extracting, by means of the same neural network, the characteristics of the template frame and the detection frame; or
respectively extracting, by means of different neural networks of the same structure, the characteristics of the template frame and the detection frame.

4. The method according to claim 1, wherein the template frame is a frame which is before the detection frame in detection timing in the video sequence and determined by the detection box for the target object.

5. The method according to claim 1, wherein the detection frame is a current frame on which target object detection needs to be performed, or a regional image which may comprise the target object in the current frame.

6. The method according to claim 5, wherein when the detection frame is the regional image which may comprise the target object in the current frame on which the target object detection needs to be performed, the method further comprises:
taking a center point of the template frame as the center point, capturing the regional image with a length and/or width correspondingly greater than the image length and/or width of the template frame in the current frame as the detection frame.

7. The method according to claim 1, wherein obtaining the classification weight of the local region detector based on the characteristic of the template frame comprises:
performing a convolution operation on the characteristic of the template frame by means of a first convolutional layer, wherein a first characteristic obtained by the convolution operation is used as the classification weight of the local region detector.

8. The method according to claim 1, wherein obtaining the regression weight of the local region detector based on the characteristic of the template frame comprises:
performing the convolution operation on the characteristic of the template frame by means of a second convolutional layer, wherein a second characteristic obtained by the convolution operation is used as the regression weight of the local region detector.

9. The method according to claim 1, wherein inputting the characteristic of the detection frame into the local region detector to obtain classification results and regression results of multiple alternative boxes output by the local region detector comprises:
using the classification weight to perform the convolution operation on the characteristic of the detection frame to obtain the classification results of the multiple alternative boxes; and using
the regression weight to perform the convolution operation on the characteristic of the detection frame to obtain the regression results of the multiple alternative boxes.

10. The method according to claim 9, wherein after the characteristic of the detection frame is extracted, the method further comprises: performing the convolution operation on the characteristic of the detection frame by means of a third convolutional layer to obtain a third characteristic, the number of channels of the third characteristic being identical to that of the characteristic of the detection frame; and using the classification weight to perform the convolution operation on the characteristic of the detection frame to obtain the classification results of the multiple alternative boxes comprises: using the classification weight to perform the convolution operation on the third characteristic to obtain the classification results of the multiple alternative boxes.

11. The method according to claim 9, wherein after the characteristic of the template frame is extracted, the method further comprises: performing the convolution operation on the characteristic of the detection frame by means of a fourth convolutional layer to obtain a fourth characteristic, the number of channels of the fourth characteristic being identical to that of the characteristic of the detection frame; and using the regression weight to perform the convolution operation on the characteristic of the detection frame to obtain the regression results of the multiple alternative boxes comprises: using the regression weight to perform the convolution operation on the fourth characteristic to obtain the regression results of the multiple alternative boxes.

12. The method according to claim 1, wherein obtaining the detection box for the target object in the detection frame according to the classification results and regression results of the multiple alternative boxes output by the local region detector comprises:

selecting one alternative box from the multiple alternative boxes according to the classification results and the regression results, and performing regression on the selected alternative box according to an offset of the selected alternative box to obtain the detection box for the target object in the detection frame.

13. The method according to claim 12, wherein selecting one alternative box from the multiple alternative boxes according to the classification results and the regression results comprises:

selecting one alternative box from the multiple alternative boxes according to weight coefficients of the classification results and the regression results.

14. The method according to claim 12, wherein after the regression results are obtained, the method further comprises: adjusting the classification results according to the regression results; and selecting one alternative box from the multiple alternative boxes according to the classification results and the regression results comprises: selecting one alternative box from the multiple alternative boxes according to the adjusted classification results.

15. A target detecting network training method, comprising:

separately extracting, by means of a neural network, characteristics of a template frame and a detection frame, wherein the template frame is a detection box image of a target object, and the template frame is smaller than the detection frame in image size;

performing a convolution operation on the characteristic of the template frame by means of a first convolutional layer, wherein a first characteristic obtained by the convolution operation is used as a classification weight of a local region detector; and performing the convolution operation on the characteristic of the template frame by means of a second convolutional layer, wherein a second characteristic obtained by the convolution operation is used as a regression weight of the local region detector;

inputting the characteristic of the detection frame into the local region detector to obtain classification results and regression results of multiple alternative boxes output by the local region detector;

obtaining a detection box for the target object in the detection frame according to the classification results and regression results of the multiple alternative boxes output by the local region detector; and taking the obtained detection box for the target object in the detection frame as a predictive detection box, training the neural network, the first convolutional layer, and the second convolutional layer based on label information of the detection frame and the predictive detection box.

16. The method according to claim 15, wherein the label information of the detection frame comprises: a labeled position and size of the detection box for the target object in the detection frame; and taking the obtained detection box for the target object in the detection frame as the predictive detection box, training the neural network, the first convolutional layer, and the second convolutional layer based on label information of the detection frame and the predictive detection box comprises:

adjusting the weighted values of the neural network, the first convolutional layer, and the second convolutional layer according to a difference between the labeled position and size of the detection box and the position and size of the predictive detection box.

17. An electronic device, comprising:
a memory, configured to store executable instructions; and
a processor, configured to communicate with the memory to execute the executable instructions so as to:
separately extract, by means of a neural network, characteristics of a template frame and a detection frame wherein the template frame is a detection box image of a target object, and the template frame is smaller than the detection frame in image size;
obtain a classification weight and a regression weight of a local region detector based on the characteristic of the template frame;
input the characteristic of the detection frame into the local region detector to obtain classification results and regression results of multiple alternative boxes output by the local region detector; and
obtain a detection box for the target object in the detection frame according to the classification results and regression results of the multiple alternative boxes output by the local region detector.

18. A non-transitory computer storage medium, configured to store computer-readable instructions, wherein when the instructions are executed, the operations of the method according to claim 1 are implemented.

19. An electronic device, comprising:
a memory, configured to store executable instructions; and
a processor, configured to communicate with the memory to execute the executable instructions so as to complete the operations of the method according to claim 15.

20. A non-transitory computer storage medium, configured to store computer-readable instructions, wherein when the instructions are executed, the operations of the method according to claim 15 are implemented.

\* \* \* \* \*